(12) United States Patent
Lore et al.

(10) Patent No.: US 8,019,643 B2
(45) Date of Patent: Sep. 13, 2011

(54) SYSTEM AND METHOD FOR INCORPORATING PACKAGING AND SHIPPING RAMIFICATIONS OF NET PROFIT/LOSS WHEN UP-SELLING

(75) Inventors: Marc Lore, Mountain Lakes, NJ (US); Weihua Yan, Flushing, NY (US)

(73) Assignee: Quidsi, Inc., Jersey City, NJ (US)

( * ) Notice: Subject to any disclaimer, the term of this patent is extended or adjusted under 35 U.S.C. 154(b) by 445 days.

(21) Appl. No.: 12/126,435

(22) Filed: May 23, 2008

(65) Prior Publication Data
US 2008/0294477 A1   Nov. 27, 2008

Related U.S. Application Data

(60) Provisional application No. 60/940,132, filed on May 25, 2007.

(51) Int. Cl.
G06Q 99/00 (2006.01)
(52) U.S. Cl. ........ 705/14.1; 705/1.1; 705/26.1; 705/400
(58) Field of Classification Search .................... 705/1.1, 705/7, 10, 14.7, 35, 330, 400, 7.35, 14.1, 705/26.1; 235/376
See application file for complete search history.

(56) References Cited

U.S. PATENT DOCUMENTS

| | | | |
|---|---|---|---|
| 5,072,397 A | 12/1991 | Barns et al. | |
| 5,815,398 A | 9/1998 | Dighe et al. | |
| 5,936,863 A | 8/1999 | Kostelnik et al. | |
| 6,064,981 A | 5/2000 | Barni et al. | |
| 6,119,099 A * | 9/2000 | Walker et al. ................... | 705/16 |
| 6,233,568 B1 | 5/2001 | Kara | |
| 6,615,104 B2 | 9/2003 | England et al. | |
| 6,721,762 B1 | 4/2004 | Levine et al. | |
| 6,876,958 B1 | 4/2005 | Chowdhury et al. | |
| 6,882,892 B2 | 4/2005 | Farrah et al. | |
| 6,980,934 B1 | 12/2005 | Sadovnik | |
| 7,035,832 B1 | 4/2006 | Kara | |
| 7,085,687 B2 | 8/2006 | Eckenwiler et al. | |
| 2001/0039516 A1 * | 11/2001 | Bennett et al. ................... | 705/26 |

(Continued)

OTHER PUBLICATIONS

Ferriolo, Shayne, "When Less Isn't More", Jan. 2003, Catalog Age, p. 38-39.*

(Continued)

*Primary Examiner* — John W Hayes
*Assistant Examiner* — Freda A Nelson
(74) *Attorney, Agent, or Firm* — Fish & Richardson P.C.

(57) ABSTRACT

An up-sell and down-sell method and system that considers a ranking of the individual marginal profit/loss of adding every product SKU of a merchant to an order (or a certain subset of SKU's based on other criteria), considering not only certain traditional fixed metrics the merchant may define such as product gross margins, credit card fees and labor costs (the cost of the pick)—but most importantly, variable packaging and shipping costs as well. In particular, the invention focuses on the packaging and shipping ramifications of up-selling every potential merchant SKU (or a certain subset of SKU's based on other criteria) to customer's order and down-selling each item already in customer's order. Once an adjusted net profit/loss ranking by SKU is available that considers variable shipping and packaging ramifications of up-selling such SKU to an existing order, a merchant can then determine to factor such ranking in how it up-sells or down-sells—including but not limited to up-selling certain SKU's and not others, structuring different discounts on different SKU's and potentially incentivizing customers to delete certain items in their order.

30 Claims, 2 Drawing Sheets

U.S. PATENT DOCUMENTS

| | | |
|---|---|---|
| 2002/0046191 A1* | 4/2002 | Joao .............................. 705/400 |
| 2003/0200111 A1 | 10/2003 | Damji |
| 2004/0111336 A1 | 6/2004 | Argust et al. |
| 2004/0249723 A1 | 12/2004 | Mayer |
| 2004/0254808 A1 | 12/2004 | Bennett et al. |
| 2005/0010424 A1 | 1/2005 | Sherman et al. |
| 2006/0095354 A1 | 5/2006 | Hamzy et al. |
| 2006/0195364 A1 | 8/2006 | Shroff et al. |
| 2006/0271387 A1 | 11/2006 | Gruger et al. |
| 2008/0154659 A1* | 6/2008 | Bettes et al. .................... 705/7 |
| 2009/0099935 A1* | 4/2009 | Hamzy et al. ................... 705/14 |
| 2009/0138365 A1* | 5/2009 | Mueller et al. .................. 705/14 |

OTHER PUBLICATIONS

Miller, Paul and Del Franco, "The Price of free S&H", Oct. 2002, p. 0_1 (4 pgs).*

* cited by examiner

US 8,019,643 B2

SYSTEM AND METHOD FOR INCORPORATING PACKAGING AND SHIPPING RAMIFICATIONS OF NET PROFIT/LOSS WHEN UP-SELLING

CROSS-REFERENCE TO RELATED APPLICATIONS

The present application claims the benefit of U.S. Provisional Application No. 60/940,132, filed on May 25, 2007, which is incorporated herein by reference.

STATEMENT REGARDING FEDERALLY SPONSORED RESEARCH OR DEVELOPMENT

The present invention was not developed with the use of any Federal Funds, but was developed independently by the inventor.

BACKGROUND OF THE INVENTION

Up-selling is a cornerstone practice of most catalog and e-commerce merchants. In many instances, especially low margin industries, the art of up-selling may comprise most of the profit made by a merchant. During the ordering process online merchants have traditionally sought to up-sell products to the customer on a range of metrics. These include, but are not limited to, product preferences the customer has indicated, similar products to the items already in customer's order, products other customers have historically added with the same order, and products with the highest gross margin.

To date, merchants have not considered all of the packaging and shipping ramifications of which particular products or SKU's they up-sell or down-sell and how. Specifically, at any given point in time, a merchant has a defined, limited set of boxes the merchant can employ to package and ship a customer's order. Up-selling certain products with certain dimensions and weights often requires a packaging reconfiguration. This occurs, for example, where the additional product does not fit in the optimal box for the original order. Hence, up-selling different products usually results in different optimal packaging reconfigurations. For example, instead of using BOX A with a certain dimension that packages the existing order optimally, merchant may now have to use BOX D with a certain larger dimension to package the order optimally. Each reconfiguration usually has a different net packaging and shipping cost. All other costs and preferences being equal (which they obviously are not), it will be preferable to up-sell certain SKU's more than others and relatedly, and perhaps to incentivize (by discounts or otherwise), certain SKU's more than others.

Indeed, to optimally rank which products to up-sell and how, a merchant must simulate how each order must be re-packed if up-selling any particular product and then calculate the additional total packaging and shipping costs. The economic consequences can be significant. Consider, for example, a merchant who tries to up-sell a certain product because it has a relatively high gross margin. And yet, given the customer's existing order, the size of the new product and available box sizes, the product addition requires merchant to now ship the order in 2 boxes, resulting in a net loss.

The shipping ramifications of up-selling are even more profound for merchants who use carriers with rate structures based on dimensional weight. These rate structures generally price the cost of shipment based on weight. Each pound costs more to ship. When a package crosses a certain dimensional threshold, however, the carrier assigns it an adjusted "dimensional" weight based on a pre-determined formula. Once crossing the threshold, the bigger the package, the higher the adjusted, dimensional weight. The carrier then charges the merchant the HIGHER of the dimensional weight or the actual weight.

Under a dimensional weight rate structure, a customer's order may already be "dimmed" (i.e., the adjusted weight, because of the large dimension, is greater than the actual weight). In such instances, merchant can up-sell certain SKU's with certain weights that fit into the optimal box already selected without any additional shipping costs. For example, a customer package may actually weigh 20 pounds but be sufficiently large to have a dimensional weight of 30 pounds which the carrier will charge merchant to ship the product. Here, any SKU's having a weight of 10 pounds or less which fit in the original optimal box housing customer's order will not cost the merchant any additional shipping fee from the carrier. Only by simulating how the new order (with the item being upsold) will be packed and examining the new packaging and shipping fees can the merchant optimally determine what and how to up-sell.

BRIEF DESCRIPTION OF THE DRAWINGS

The foregoing summary, as well as the following detailed description of various embodiments of the present invention, will be better understood when read in conjunction with the appended drawings. For the purpose of illustrating the embodiments, there are shown in the drawings embodiments which are presently preferred. As should be understood, however, the embodiments of the present invention are not limited to the precise arrangements and instrumentalities shown. In the drawings.

SUMMARY OF THE INVENTION

The aforementioned needs are satisfied at least in part by a method and system for considering packaging and shipping cost ramifications when up-selling different products. The method is performed by an up-selling tool that is instantiated on a computing device.

The tool comprises a subsystem for determining the incremental shipping and packaging cost associated with up-selling each product, the incremental shipping and packaging determining subsystem comprising a subsystem for simulating an optimal or a near-optimal packaging solution for minimizing the net shipping and packaging associated with up-selling each product. A subsystem is provided for determining the adjusted net profit associated with up-selling each product which considers the incremental shipping costs and packaging costs of up-selling such product. A subsystem is provided determining at least one candidate product to be offered to the customer for up-selling based on the incremental shipping and packaging cost associated with each of the at least one products. A subsystem is also provided for offering the at least one candidate product for up-selling to the customer. The packaging solution may be based on the available room or weight in the existing box for the customer's order prior to up-selling, the need and additional cost of a larger box in inventory if room or weight is unavailable and the need and cost (packaging and shipping) of an additional box if no single available box will fit the candidate product within volume or weight restrictions.

The tool may include a subsystem for ranking the at least one candidate products based on an adjusted net profit that considers the incremental shipping and packaging cost associated with up-selling the at least one candidate product. And, the offering subsystem offers at least one of the candidate products to be up-sold to the customer based on the ranking. The ranking subsystem may base the ranking on a stored ranking of products available for up-selling based on the adjusted net profit of up-selling each product.

A subsystem may also be provided for narrowing the number of at least one product considered in the incremental shipping and packaging cost determining subsystem.

In one preferred embodiment, the simulating subsystem may analyze the customer order to determine the net marginal profit associated with deleting a product from the customer order, whereby the tool determines the desirability of down-selling the product.

In another preferred form of the invention the net profit metric considers a fixed profit margin or loss of up-selling candidate product which may include product margin, credit card fees, labor fees and other costs associated with selling the product and adjusts such cost by subtracting the incremental shipping and packaging cost.

DETAILED DESCRIPTION OF THE PREFERRED EMBODIMENTS

Figure 1:
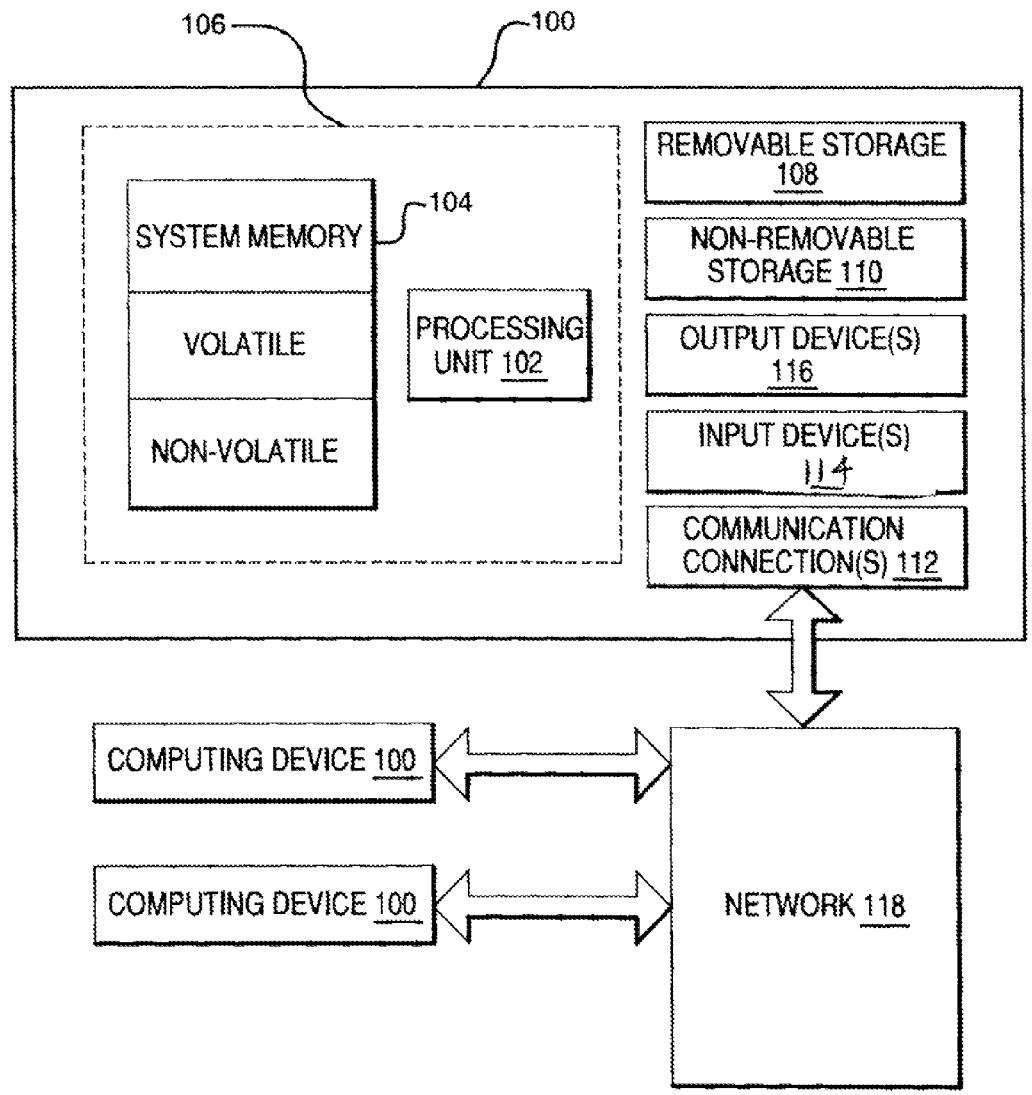
FIG. 1 is a block diagram of an example of a computing environment within which various embodiments of the present invention may be implemented and FIG. 2 is a block diagram of an up-selling tool instantiated on a computing device showing some of the steps of the method and system in accordance with various embodiments of the present invention.

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, and the like that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1 an exemplary system for implementing aspects described herein includes a computing device, such as a computing device 100. In its most basic configuration, the computing device 100 typically includes at least one processing unit 102 and a memory 104. Depending on the exact configuration and type of the computing device, the memory 104 may be volatile (such as random access memory (RAM)), non-volatile (such as read-only memory (ROM), flash memory, and the like), or some combination of the two. This most basic configuration is illustrated in FIG. 14 by dashed line 106. The computing device 100 may have additional features/functionality. For example, the computing device 100 may include additional storage (removable and/or non-removable) including, but not limited to, magnetic or optical disks or tape. Such additional storage is illustrated in FIG. 14 by removable storage 108 and non-removable storage 110.

The computing device 100 typically includes or is provided with a variety of computer-readable media. The computer readable media can be any available media that can be accessed by the computing device 100 and includes both volatile and non-volatile media, removable and non-removable media. By way of example, and not limitation, the computer readable media may comprise computer storage media and communication media.

The computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 100. Any such computer storage media may be part of computing device 100.

The computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

The computing device 100 may also include input device (s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, the computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Figure 2:
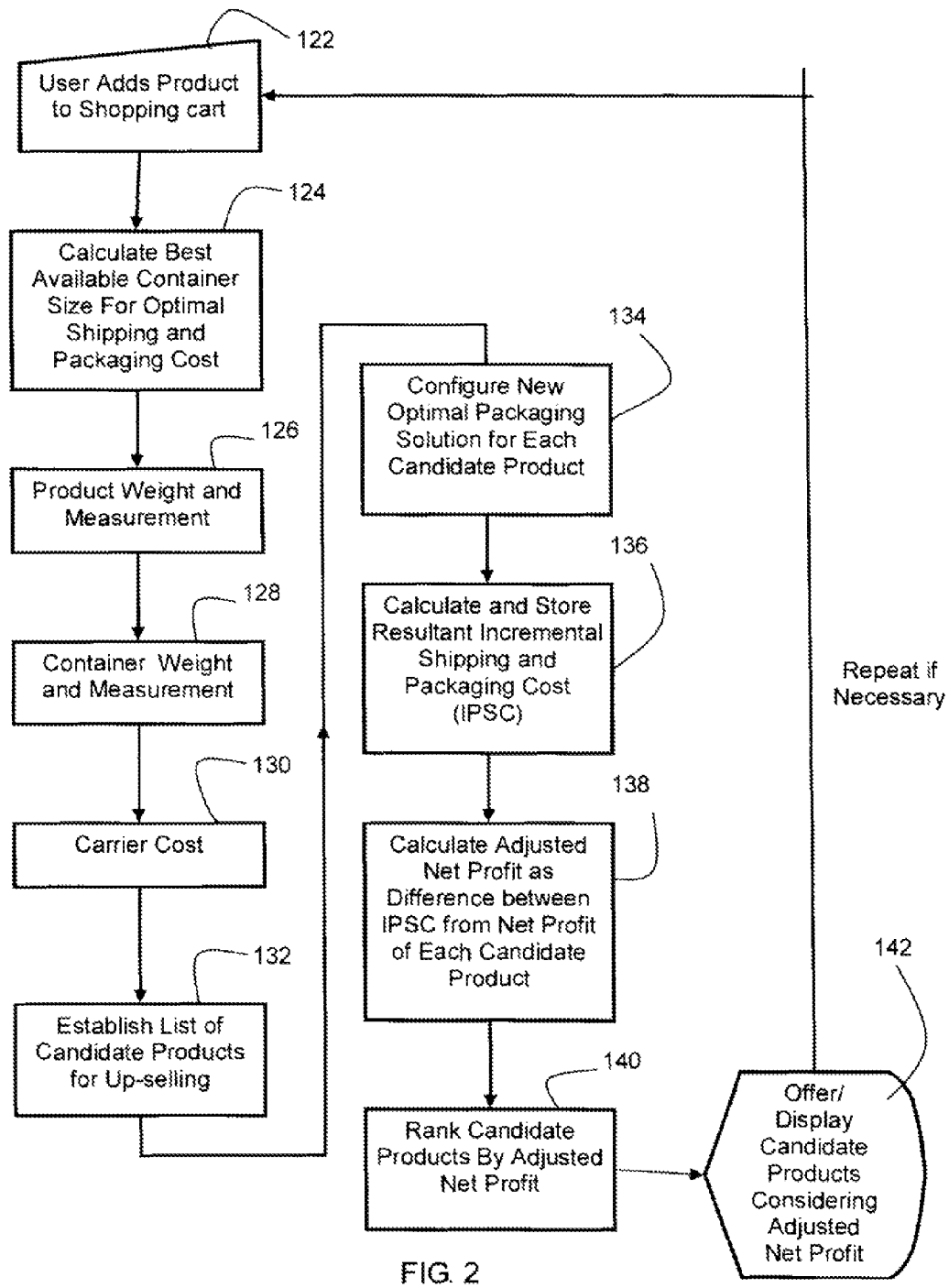

In FIG. 2 there is shown a preferred embodiment of a tool 120 for optimizing net profit/loss by incorporating packaging and shipping ramifications when up-selling in accordance with the present invention.

In one form of the invention, the invention comprises a tool 120 for up-selling products or SKU's to a customer during a purchasing transaction of one or more products or SKU's with a merchant. The transaction begins when the customer selects one or more products in step 122 for purchase. Once the customer has selected the products(s) that are desired to be purchased, the best box size for optimal shipping and packaging costs are calculated in step 124. Preferably, this calculation is determined by considering the box sizes available to the merchant, the weight of the product(s), the dimension of the product(s), the labor costs associated with effecting the transaction, and the selected carrier costs which are typically based on delivery distance and other parameters. These factors are described in greater detail below.

The tool now determines which particular SKU to up-sell to the customer,

Each SKU that a merchant has available for sale has a fixed profit margin (or loss). The fixed product margin may include product margin, credit card fees, labor fees, and other costs associated with selling the product. Typically, the product margin is the sale price of the product less the cost of the product. The credit card fees are typically based on the sale price of the product and are typically a percentage of the sales price. The labor fee is the cost to effect the transaction for the selected products.

The fixed profit margin for each SKU is stored in the tool 120. A merchant may consider this fixed profit margin when considering what SKU to up-sell since the merchant knows the profit margin in advance.

Up-selling a particular SKU to a particular existing customer order, however, results in incremental or variable shipping/packaging costs which depend on the contents of the existing order and the available boxes. As such, the tool can only determine these variable costs once the customer has indicated an interest to purchase an item. These incremental costs are the critical criteria for determining which SKU to up-sell or down-sell in this form of invention. Merchants have not heretofore considered these incremental costs when up-selling.

Incremental shipping/packaging costs (ISPC) include any cost which changes depending upon the contents of an existing order and are determined in steps 126 to 136, as described in detail below.

In step 126, each SKU offered to be sold by a merchant is first weighed and measured and stored in the tool 120.

In step 128, each available container that can potentially be used by the merchant to package and ship customers' orders is also weighed and measured and stored in the tool 120.

In step 130, the rate structure/tables of the merchant's shipping carriers are stored into the system. Typically, the carrier costs are based on shipping distance, container weight, and other parameters.

Optionally, in step 132, the tool may now narrow the potential candidate products whose net marginal profit/loss it will analyze for the purpose of deciding what and how to up-sell to either (a) subsets of products the customer has indicated an interest by previous behavior, such as previous purchasing transactions (b) similar products to the items already in customer's order, (c) products other customers have historically added with the same order, (d) products appropriate for the age and/or other demographic parameters of the customer, (e) a combination of any of these or different factors, and the like.

Before determining candidate products to up-sell, down-sell and how to sell them, in step 138, the tool 120 analyzes each potential candidate product (as potentially narrowed in optional step 136) and simulates, through a computer algorithm, a preferred packing solution if the customer singly selects that candidate item and adds that item to his/her order. It should be understood that the system of the present invention can use different optimization methods to optimize or near-optimize how a customer's order will be repacked if a particular candidate item is up-sold.

For example, in one preferred optimization method the tool 120 considers packaging costs, rate tables and a boxing program that optimizes the lowest net total shipping and packaging cost. In an alternate optimization method, the tool may use shortcuts to near optimize the lowest net total shipping and packaging cost. For example, the tool may first attempt to pack the items in the fewest amount of shipments, and then select the smallest box available in which all the customer's items fit, since that will often be the optimal solution.

Preferably, the optimization algorithm considers one or more of the following criteria: (a) whether room is available in existing box chosen for product(s) already selected by the customer (b) whether weight is available in existing box chosen for product(s) selected by the customer(if there are weight restrictions, self-imposed or otherwise)(c) the cost of larger box, if room is unavailable in the box selected in step 124 (d) the cost of adding an additional box if no single available box will fit the candidate product within volume or weight restrictions, and/or (5) the shipping rate tables based on weight, volume or a combination of weight and volume such as dimensional weight for each potential boxing and packaging configuration.

Once an optimal or near-optimal packing solution is determined in step 134 for each potential SKU that can be up-sold, in step 136, the tool 120 calculates and stores the incremental packaging and shipping cost (IPSC) for up-selling each SKU (pursuant to the carrier rate table and packaging rate table in the system)—given that the weight and container dimensions of the potential new order are now known.

In step 138, the tool 120 determines the adjusted net profit for each candidate product. The adjusted net profit is the difference between 1. the incremental packaging and shipping cost of up-selling each potential SKU and 2. a net profit metric selected by the merchant, such as the gross margin and/or incremental labor cost of the transaction adjusted for shipping and packaging costs if the product were upsold to the customer's present order.

Once the tool 120 has calculated the adjusted net profit of up-selling each SKU to a customer in step 138, the tool ranks the SKU's in step 140 according to the adjusted net profit for each product. In this way the merchant can make up-selling decisions based on this ranking. For example, based on customer's order, the merchant can then choose to, for example:
  (a) up-sell only the highest ranking SKU's and not others;
  (b) more prominently and/or more frequently advertise some SKU's more than others; and/or
  (c) incentivize the purchase of higher ranking SKU's more than others, via higher discounts, larger promotions or otherwise In step 142, the tool 120 displays the selected candidate products to be up-sold to the customer based on, or considering, the adjusted net profit of the candidate items ranked in step 140.

If needed, the process can be repeated such as, for example if the customer has altered the products in his or her order or if the list of candidate SKU's to be up-sold has changed because the customer has entered a new zone or area of the merchant's store or website.

In an alternate preferred embodiment, for certain common customer orders and/or certain common preferences, the tool 120 can pre-program or pre-store the ranking of which SKU's to up-sell as it relates to the marginal adjusted net profit (or loss) impact—without having to re-simulate the variable packaging and shipping costs in step 134.

In yet another embodiment, once the tool 120 is aware of each of the items in a customer's proposed final order, it can determine how it will pack and ship the item and the associated net profit (or loss). It can then analyze (through computer algorithm simulation described in Step 134) the optimal packaging reconfiguration should any item of the order be deleted and the associated marginal net profit. Based on the results (e.g., where the deletion of certain items results in a repackaging with a net profit gain), the tool can attempt to down-sell certain items from customer's order through credits or otherwise. For example, consider a customer order where a certain item with relatively low fixed gross margin required two shipments and therefore high proportionate shipping costs—but deletion of that item would then allow the order to be packaged in one shipment.

The following example illustrates the tool 120 in use.

A merchant carries 500 SKU's of various baby products, including diapers, wipes, formula and baby care items. The merchant carries 20 different boxes of various sizes to ship its orders—from BOX 1 to BOX 20.

Each SKU has a fixed profit margin (or loss) that is stored in the computer database of the tool 120 which is the gross margin less credit card fees, labor fees, and other costs. For example, if the most popular case of diapers is PAMPERS CRUISERS diapers, the fixed profit margin for this SKU may be $5. Alternatively, the fixed profit margin for a can of DESITIN diaper cream may be $3.

The merchant uses a particular common carrier, such as UPS, as its shipping carrier. For this carrier, shipping charges are determined by the weight and dimension of each package and the proposed delivery distance—all of which is summarized in a rate chart. The rate chart has been stored in the database. Each SKU and box also has been weighed and measured and entered into the computer database as well. The shipping and packaging cost of each SKU is a incremental cost since it depends on the pre-existing order and available box sizes.

Up-selling any particular SKU to any particular pre-existing order results in incremental shipping and packaging costs that cannot be entered into the database in advance of knowing what the proposed shopping cart is, since it is not yet known which other preexisting item(s) the potential SKU to be upsold will be combined with and how the new order will need to be repackaged after the up-sell—given the available box sizes, As a general matter, the merchant can attempt to up-sell any of its 500 SKU's. For example, it may decide if will always try to up-sell the fixed higher margin items ahead of the lower margin items. So, it could always try to up-sell the PAMPERS CRUISERS diapers ahead of the DESITIN diaper cream because the database is displaying a $2 higher fixed profit margin for the PAMPERS CRUISERS. But with certain preexisting orders, up-selling certain SKUs—including those with the highest fixed margin items—could produce a negative result.

For example, Customer A may have a large order of 3 PAMPERS CRUISERS in her shopping cart which fits only in BOX 20, the largest box available to the merchant. Should the merchant attempt to up-sell another Pampers Cruiser (at a $5 fixed margin), it would not fit into BOX 20. Instead, the merchant would have to ship that extra PAMPERS CRUISERS item into an entirely separate, $2^{nd}$ box where the upfront shipping and packaging cost of a $2^{nd}$ box may be significant.

Alternatively, the much smaller DESITIN cream would fit into BOX 20—and up-selling that item would result in a much lower packaging and shipping cost—and therefore a higher total adjusted net profit, despite the lower $3 fixed profit margin (when compared to the $5 fixed profit margin of the PAMPERS CRUISERS). Indeed, the cost of shipping a $2^{nd}$ box may sometimes result in a net loss, in which case the merchant may decide not to up-sell the item at all. In another example, however, a preexisting order may contain just two PAMPERS CRUISERS in which case up-selling an additional PAMPERS CRUISERS will fit into BOX 20 and therefore up-selling this item will generate more adjusted net profit than up-selling the DESITIN cream.

Given the scenarios described above, in order to maximize the adjusted net profit of up-selling any particular SKU—once a customer proposes a final order in her shopping cart—the tool 120 analyzes each of the potential 500 SKU's it could up-sell and simulates an optimal packing solution should the customer add that item to his/her order. Once that solution is determined, the tool adds the incremental packaging and shipping cost of up-selling each potential SKU to the pre-determined fixed profit margin (or loss) (however defined by merchant) of up-selling each SKU to determine a net marginal profit/loss of up-selling each SKU.

Once the tool has determined the net marginal profit/loss of up-selling each SKU to a customer order, it can rank the marginal net profit/loss of each SKU accordingly. It should be understood that this up-selling ranking of each SKU depends on the preexisting order and available boxes in inventory.

The merchant can then make up-selling decisions based on this ranking. For example, based on a customer's order, it may then choose to:

a. up-sell only the highest ranking SKU's and not others;
b. more prominently and/or more frequently advertise some SKU's more than others; and/or
c. incentivize the purchase of higher ranking SKU's more than others, via higher discounts, larger promotions or otherwise.

The tool may also limit which SKU's will rank based on customer's interests. For example, the merchant can inquire which of the following categories the customer is interested in: (i) diapers (ii) wipes (iii) formula and (iv) baby care. Should customers choose only baby care, the merchant may only need to analyze baby care SKU's when ranking the marginal net profit/loss of up-selling.

The particular embodiments described herein are provided by way of example and are not meant in any way to limit the scope of the claimed invention. It is understood that the invention is not limited to the disclosed embodiments, but on the contrary, is intended to cover various modifications and equivalent arrangements included within the spirit and scope of the appended claims. Without further elaboration, the foregoing will so fully illustrate the invention, that others may by current or future knowledge, readily adapt the same for use under the various conditions of service.

What is claimed is:

1. A system to up-selling goods or services to a customer order, the system comprising:
    a memory configured to store information related to a customer order; and
    a processor configured to process the stored information related to the customer order, the processor being configured to perform operations comprising:
        receiving, with at least one processor, information related to a customer order for goods or services;
        determining, with at least one processor, a first cost related to shipping and packaging the customer order;
        determining, with the at least one processor, information related to at least two options associated with the customer order to present to the customer for up-selling additional goods or services related to the customer order, the at least two options being associated with information for a net profit metric, the net profit metric including information for at least one of a profit and a loss associated with the at least two options;
        determining, with the at least one processor, a second cost related to shipping and packaging the additional goods or services with the customer order;
        determining, with the at least one processor, an incremental packaging and shipping cost at least from the first and second costs, the incremental packaging and shipping cost relating to a cost for packaging and shipping the additional goods or services with the customer order;
        determining, with the at least one processor, an adjusted net profit for up-selling the additional goods or services with the customer order, the adjusted net profit being determined at least from the net profit metric and the incremental packaging and shipping cost;
        ranking, with the at least one processor, the at least two options to present to the customer for up-selling the additional goods or services related to the customer order based on the adjusted net profit; and
        presenting, for a graphical user interface (GUI), information for the at least two options based upon the ranking.

2. The system of claim 1, further comprising:
    a subsystem for determining the adjusted net profit associated with up-selling each of the options, the options being associated with a fixed profit or loss metric of up-selling each of the additional goods or services and subtracts the incremental shipping costs and packaging costs of up-selling each of the additional goods and services, and wherein the subsystem is configured to determine at least one candidate good or service to offer to the customer for up-selling based on the adjusted net profit of the candidate good or service.

3. The system of claim 2, wherein the fixed profit or loss metric is based on at least one of a product margin, credit card fees, labor fees or other costs associated with up-selling the candidate good or service.

4. The system of according to claim 3, wherein the subsystem is configured to determine the fixed profit or the loss metric of up-selling each candidate product by accounting for the additional shipping and packaging cost of up-selling each option with the customer order.

5. The system of according to claim 1, further comprising a subsystem for simulating a packaging solution for minimizing the incremental shipping and packaging cost.

6. The system of claim 5, wherein the packaging solution is based on factors for at least one of an amount of available room or weight in a box for the customer order prior to up-selling the options, a requirement for another box in an inventory of boxes, a cost of the other box in the inventory of boxes, a volume restriction, and a weight restriction.

7. The system of claim 1, further comprising:
    a subsystem for the ranking based on the adjusted net profit associated with the up-selling; and
    an offering subsystem configured to offer at least one of the options for the additional goods or services to be up-sold to the customer based on the ranking.

8. The system of claim 1, further comprising:
    a subsystem configured to reduce a number of options based on the determination of the incremental shipping and packaging cost.

9. The system of claim 1, further comprising a ranking subsystem configured to generate the ranking at least based on a stored ranking of information for additional goods and services available for up-selling and respective adjusted net profit of up-selling each of the available goods and services.

10. A method for up-selling goods or services to a customer order, the method comprising:
    receiving, with at least one processor, information related to a customer order for goods or services;
    determining, with at least one processor, a first cost related to shipping and packaging the customer order;
    determining, with the at least one processor, information related to at least one option associated with the customer order to present to the customer for up-selling additional goods or services related to the customer order, the option being associated with information for a net profit metric, the net profit metric including information for at least one of a profit and a loss associated with the option;

determining, with the at least one processor, a second cost related to shipping and packaging the additional goods or services with the customer order;

determining, with the at least one processor, an incremental packaging and shipping cost at least from the first and second costs, the incremental packaging and shipping cost relating to a cost for packaging and shipping the additional goods or services with the customer order;

determining, with the at least one processor, an adjusted net profit for up-selling the additional goods or services with the customer order, the adjusted net profit being determined at least from the net profit metric and the incremental packaging and shipping cost;

determining whether there is a positive adjusted net profit;

determining whether to present the at least one option to the customer for up-selling the additional goods or services related to the customer order based upon determining that there is the positive adjusted net profit; and presenting, for a graphical user interface (GUI), information for the at least one option based upon the determination to present the at least one option to the customer for up-selling the additional goods or services related to the customer order.

11. The method of claim 10, further comprising determining the incremental packaging and shipping cost by subtracting the first cost from the second cost.

12. The method of claim 11, further comprising determining the second cost from packaging costs, rate tables, and boxing options associated with adding the additional goods or services to the customer order.

13. The method of claim 10, further comprising determining the adjusted net profit by subtracting a value for the net profit metric from the incremental packaging and shipping cost.

14. The method of claim 13, further comprising determining the net profit metric from at least one of information associated with a product margin, credit card fees, labor fees and other costs associated with including the additional goods or services with the customer order.

15. The method of claim 10, further comprising presenting, further comprising presenting, for the GUI, information for the at least one option based upon the adjusted net profit exceeding an amount.

16. A method for up-selling goods or services to a customer order, the method comprising:

receiving, with at least one processor, information related to a customer order for goods or services;

determining, with at least one processor, a first cost related to shipping and packaging the customer order;

determining, with the at least one processor, information related to at least two options associated with the customer order to present to the customer for up-selling additional goods or services related to the customer order, the at least two options being associated with information for a net profit metric, the net profit metric including information for at least one of a profit and a loss associated with the at least two options;

determining, with the at least one processor, a second cost related to shipping and packaging the additional goods or services with the customer order;

determining, with the at least one processor, an incremental packaging and shipping cost at least from the first and second costs, the incremental packaging and shipping cost relating to a cost for packaging and shipping the additional goods or services with the customer order;

determining, with the at least one processor, an adjusted net profit for up-selling the additional goods or services with the customer order, the adjusted net profit being determined at least from the net profit metric and the incremental packaging and shipping cost;

ranking, with the at least one processor, the at least two options to present to the customer for up-selling the additional goods or services related to the customer order based on the adjusted net profit; and presenting, for a graphical user interface (GUI), information for the at least two options based upon the ranking.

17. The method claim 16, further comprising:

analyzing the customer order to determine another profit value associated with a removal of at least one good or service from the customer order; and determining whether to present an option with the customer order to down-sell the at least one good or service based on the analysis of the other profit value.

18. The method of claim 16, wherein:

the determining the second cost related to shipping and packaging the additional goods or services comprises determining the second cost related to shipping and packaging the additional goods or services for each of the at least two options with the customer order, the incremental packaging and shipping cost relates to the cost for packaging and shipping the additional goods or services for each of the at least two options with the customer order, and the adjusted net profit is determined at least from the net profit metric and the incremental packaging and shipping cost for each of the at least two options.

19. The method of claim 16, further comprising:

determining the incremental packaging and shipping cost by subtracting the first cost from the second cost; and determining the second cost from information associated with packaging costs, rate tables, and boxing options associated with adding the additional goods or services to the customer order.

20. The method of claim 16, further comprising determining the adjusted net profit by subtracting the net profit metric from the incremental packaging and shipping cost.

21. The method of claim 20, further comprising determining the net profit metric from at least one of a product margin, credit card fees, labor fees and other costs associated with including the additional goods or services to the customer order.

22. The method of claim 16, further comprising presenting, for the GUI, information for the at least two options by presenting the options in an order relative to their respective associated adjusted net profits.

23. A non-transitory computer-readable medium for up-selling goods or services to a customer order, the non-transitory computer-readable medium comprising instructions to cause a computer to perform operations comprising:

receiving, with at least one processor, information related to a customer order for goods or services;

determining, with at least one processor, a first cost related to shipping and packaging the customer order;

determining, with the at least one processor, information related to at least two options associated with the customer order to present to the customer for up-selling additional goods or services related to the customer order, the at least two options being associated with information for a net profit metric, the net profit metric including information for at least one of a profit and a loss associated with the at least two options;

determining, with the at least one processor, a second cost related to shipping and packaging the additional goods or services with the customer order;

determining, with the at least one processor, an incremental packaging and shipping cost at least from the first and second costs, the incremental packaging and shipping cost relating to a cost for packaging and shipping the additional goods or services with the customer order;

determining, with the at least one processor, an adjusted net profit for up-selling the additional goods or services with the customer order, the adjusted net profit being determined at least from the net profit metric and the incremental packaging and shipping cost;

ranking, with the at least one processor, the at least two options to present to the customer for up-selling the additional goods or services related to the customer order based on the adjusted net profit; and presenting, for a graphical user interface (GUI), information for the at least two options based upon the ranking.

24. The non-transitory computer-readable medium of claim 23,
wherein the non-transitory computer-readable medium further comprises instructions to cause the computer to perform operations comprising:
determining the second cost related to shipping and packaging the additional goods or services for each of the at least two options with the customer order,
determining the incremental packaging and shipping cost relating to the cost for packaging and shipping the additional goods or services for each of the at least two options with the customer order, and
determining the adjusted net profit at least from the net profit metric and the incremental packaging and shipping cost associated with each of the at least two options.

25. The non-transitory computer-readable medium of claim 23, further comprising instructions for determining, with the at least one processor, the incremental packaging and shipping cost by subtracting the first cost from the second cost.

26. The non-transitory computer-readable medium of claim 25, further comprising instructions for determining the second cost from packaging costs, rate tables, and boxing options associated with adding the additional goods or services to the customer order.

27. The non-transitory computer-readable medium of claim 23, further comprising instructions for determining the adjusted net profit by subtracting the net profit metric from the incremental packaging and shipping cost.

28. The non-transitory computer-readable medium of claim 26, further comprising instructions for determining, with the at least one processor, the net profit metric from at least one of information for a product margin, credit card fees, labor fees and other costs associated with including the additional goods or services to the customer order.

29. The non-transitory computer-readable medium of claim 23, further comprising instructions for presenting, for the GUI, information for the at least two options based upon an order in the ranking relative to an associated adjusted net profit.

30. A system to up-selling goods or services to a customer order, the system comprising:
a memory configured to store information related to a customer order; and
a processor configured to process the stored information related to the customer order, the processor being configured to perform operations comprising:
receiving, with at least one processor, information related to the customer order for goods or services;
determining, with at least one processor, a first cost related to shipping and packaging the customer order;
determining, with the at least one processor, information related to at least one option associated with the customer order to present to the customer for up-selling additional goods or services related to the customer order, the option being associated with information for a net profit metric, the net profit metric including information for at least one of a profit and a loss associated with the option;
determining, with the at least one processor, a second cost related to shipping and packaging the additional goods or services with the customer order;
determining, with the at least one processor, an incremental packaging and shipping cost at least from the first and second costs, the incremental packaging and shipping cost relating to a cost for packaging and shipping the additional goods or services with the customer order;
determining, with the at least one processor, an adjusted net profit for up-selling the additional goods or services with the customer order, the adjusted net profit being determined at least from the net profit metric and the incremental packaging and shipping cost;
determining whether there is a positive adjusted net profit;
determining whether to present the at least one option to the customer for up-selling the additional goods or services related to the customer order based upon determining that there is the positive adjusted net profit; and
presenting, for a graphical user interface (GUI), information for the at least one option based upon the determination to present the at least one option to the customer for up-selling the additional goods or services related to the customer order.

* * * * *